United States Patent
Mantell

(10) Patent No.: US 7,151,615 B2
(45) Date of Patent: Dec. 19, 2006

(54) METHOD FOR THE HANDLING OF PRINT JOB BANNER SHEET OUTPUT

(75) Inventor: David A. Mantell, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 1217 days.

(21) Appl. No.: 09/738,736

(22) Filed: Dec. 15, 2000

(65) Prior Publication Data

US 2002/0075497 A1 Jun. 20, 2002

(51) Int. Cl.
*G06F 15/00* (2006.01)
(52) U.S. Cl. .................................... 358/1.15; 358/1.1
(58) Field of Classification Search .............. 358/1.1, 358/1.8, 1.11, 1.12, 1.13, 1.14, 1.15, 1.18, 358/1.4, 1.5, 1.9, 498; 270/58.08, 58.09; 271/293, 298
See application file for complete search history.

(56) References Cited

U.S. PATENT DOCUMENTS

| | | | |
|---|---|---|---|
| 4,211,483 A | 7/1980 | Hannigan et al. | 355/14 R |
| 4,728,963 A | 3/1988 | Rasmussen et al. | 346/25 |
| 5,316,279 A | 5/1994 | Corona et al. | 270/1.1 |
| 5,342,034 A * | 8/1994 | Mandel et al. | 270/58.08 |
| 5,435,544 A * | 7/1995 | Mandel | 271/298 |
| 5,547,178 A | 8/1996 | Costello | 270/52.02 |
| 5,609,333 A * | 3/1997 | Mandel et al. | 270/58.09 |
| 5,644,685 A | 7/1997 | Baehr | 395/111 |
| 5,709,374 A | 1/1998 | Taylor et al. | 270/1.02 |
| 6,075,617 A | 6/2000 | Fischer et al. | 358/1.16 |
| 6,227,539 B1 * | 5/2001 | Ferrara | 271/293 |
| 6,373,588 B1 * | 4/2002 | Fischer et al. | 358/1.16 |

* cited by examiner

Primary Examiner—Gabriel I. Garcia
(74) Attorney, Agent, or Firm—Christopher D. Wait

(57) ABSTRACT

A method for improving human interaction with a printer and its hardcopy output. The method provides printing a print job and placing it into an output bin followed with a pause before printing a banner page for that print job. However, this banner will not be printed if the print job is removed from the output bin before the pause concludes and thus thereby expedites any subsequent printing of output that may follow. This allows the individual to pick up their print job immediately without accruing the expense or waste of printing a banner sheet.

20 Claims, 4 Drawing Sheets

METHOD FOR THE HANDLING OF PRINT JOB BANNER SHEET OUTPUT

BACKGROUND OF THE INVENTION AND MATERIAL DISCLOSURE STATEMENT

The present invention relates to a methodology for expediting the handling of print job output in the output bin of a printer. In particular, the present invention relates to where a shared printer places banner sheets with the desired printout in the output bin.

Sharing of resources has become an integral part of the typical day-to-day business operations scenario. In particular, printers of greater cost and which offer such attributes as higher speed, better resolution or color are shared. However, this means that the printed hardcopy output in the shared resource is often provided in a limited number or even a single output bin. Most printers designed for resource sharing accommodate this problem in a few ways. Typically the printer will skew or offset entire print jobs from each other. Often a banner or header page is inserted as a separator sheet between the print jobs. Examples of this are found in U.S. Pat. No. 4,211,483 to Hannigan et al., U.S. Pat. No. 5,316,279 to Corona et al., U.S. Pat. No. 5,547,178 to Costello, and U.S. Pat. No. 5,709,374 to Taylor et al., which are herein incorporated by reference in their entirety for their teaching.

Banner pages have long been associated with print jobs in shared print environments. A banner page is, typically, a printed sheet that separates one print job output from another. For example, a banner page may include the name or some other uniquely identifying feature of the user that submitted the print job, often in an eye-catching format, so that the user can easily find and separate his/her print job from the other jobs in the printer's output tray.

Traditionally, the use of banner pages has been relatively narrow in scope and purpose, reflecting the capabilities and intended use of the shared printers. For example, one banner page has typically been output on top of (or in association with) each print job submitted. If multiple copies of a particular job are requested, then multiple banner pages may also be produced. Essentially, the only option available has been whether to print the banner page with the job, or not, and even that option is not adjustable by the user because it is pre-designed at the shared print server that spools the print job to the printer.

The problem with banner pages of course is that they create waste. Often as soon as a print job is picked up the banner page is discarded. If only one sheet of paper needed to be printed, the addition of the banner sheet represents 50% waste. Furthermore, it's not unusual for the banner page to create some delay in the completion of a print job when the printer must receive the banner information from the server. See U.S. Pat. No. 6,075,617 to Fisher et al. which is hereby incorporated by reference in its entirety for its teaching. One example of this delay is a Xerox Document Centre ColorSeries 50 when connected to a LAN. If a user is present to retrieve their print job, they must wait for a banner to print they don't need. In addition there are consumables such as toner or ink which are also wasted with banner sheet printout.

Therefore, as discussed above there exists a need for a methodology which will solve the problem of print delays due to banner sheets and the waste they create. Thus, it would be desirable to solve this and other deficiencies and disadvantages with an improved methodology.

SUMMARY OF THE INVENTION

The present invention relates to a method for a shared printer to provide print jobs with banner pages to its output bin, comprising outputting a current print job to the output bin followed by pausing the output of a banner page for a fixed period of time. The printer shall then skip the printout of the banner page if the current print job is removed from the output bin before the fixed period of time has passed.

More particularly, the present invention relates to a method for a network connected printer to provide print jobs with banner pages to its output bin, comprising outputting a current print job to the output bin followed by pausing the output of a banner page for a fixed period of time. Then sensing the output bin and skipping the printout of the banner page if the current print job is removed from the output bin before the fixed period of time has passed.

Further, the present invention relates to a method for a shared printer to provide print jobs with a banner page to its output bin, comprising outputting a current print job to the output bin. Then sensing the output bin and skipping the printout of the banner page if the current print job is removed from the output bin.

DESCRIPTION OF THE INVENTION

Figure 1:
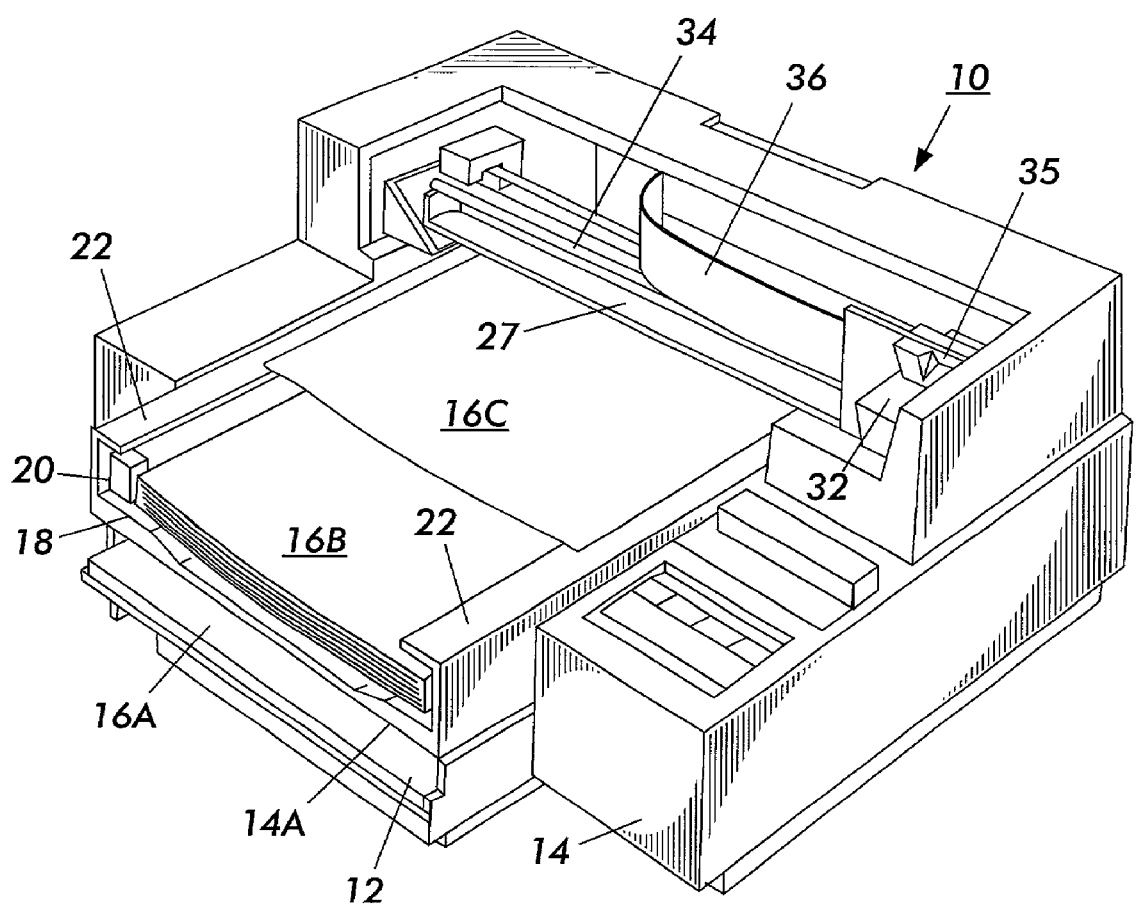
FIG. 1 depicts a typical printer with a output bin sensor.

FIG. 1 provides an ink jet printer 10. There, it will be observed that a paper input or supply tray 12 is provided in the front, or user-facing portion, 14 of the printer 10. The paper input tray 12 is configured to handle a substantial quantity of paper 16a or other medium for printing thereon. Also in the front 14 of the printer 10 is provided a paper output or collection tray 18. The paper output tray 18 is also configured to handle a substantial quantity of paper 16b.

There are two features to be noticed with regard to the paper output tray 18. First, an output bin sensor 20 is provided near the rear of the paper output tray 18. Sensor 20 is provided for indication of whether the user has removed the previous page or output paper 16b. The operation of sensor 20 may be based for example upon sensing weight, light scattering or light reflectance effects from when paper 16b is present or not in collection tray bin 18. In a preferred embodiment, an inexpensive simple LED detector pair is used that can detect either a reflectance or a scattering signal. Thus both transparencies and paper can be detected. Many other arrangements will be conceivable to those skilled in the art and as such are considered within the gambit of the present invention. It should be noted for instance that there are many arrangements for providing this sensor functionality including its placement location in the output bin. For example, many printer systems already have a sensor provided at the output for the purpose of tracking paper jams. Such arrangements may be utilized with the present invention with little or even no modification as would be evident to one skilled in the art.

Second, a pair of opposed output rails 22 is provided above the output tray 18. These output rails 22 along with the platen (not visible in this view) support a sheet of paper 16c during the printing operation to permit the ink on the sheet 16b underneath to dry. At the end of the printing cycle, when the sheet 16c is near the front 14a of the paper output tray 18, the platen pivots down, eliminating the clamping of the sheet between the platen and paper guide 27. The sheet 16c then drops into the paper output tray of its own weight. Up until the completion of the printing cycle, the rear end of the paper is supported by the paper drive roller and the platen.

The front portion 14 of the printer 10 is also provided with a control panel 28, which is electrically associated with a microprocessor/controller 200 (FIG. 2) for selection of various options relating to the printing operation. Such control operations, provided by presently-available microprocessors, are well-known in the prior art.

Also shown in FIG. 1 is a printhead carriage 35, which travels on a guide rail 34 and paper guide 27, and printhead 32 which is connected by a flexible electrical flat ribbon 36 to the microprocessor/controller 200. The microprocessor/controller 200 controls a motor, which provides movement of the printhead carriage 35. The printhead 32 is specifically designed for this ink-jet printer, and utilizes thermal ink-jet printing technology. However, the printer could operate with other ink-jet printheads if the printhead carriage interfaces are compatible, or with other carriage configurations. Further, reconfiguration of the printhead carriage 32 would permit the use of other ink-jet technologies, such as piezoelectric. Such reconfiguration is within the capabilities of one skilled in the art.

It should be noted that while the above preferred embodiment printer is an ink jet type, that an alternative equally preferred embodiment includes a laser type printer. Further as will be apparent to those skilled in the art, the techniques taught here in the present invention will be applicable to many types of hardcopy output devices.

Figure 2:
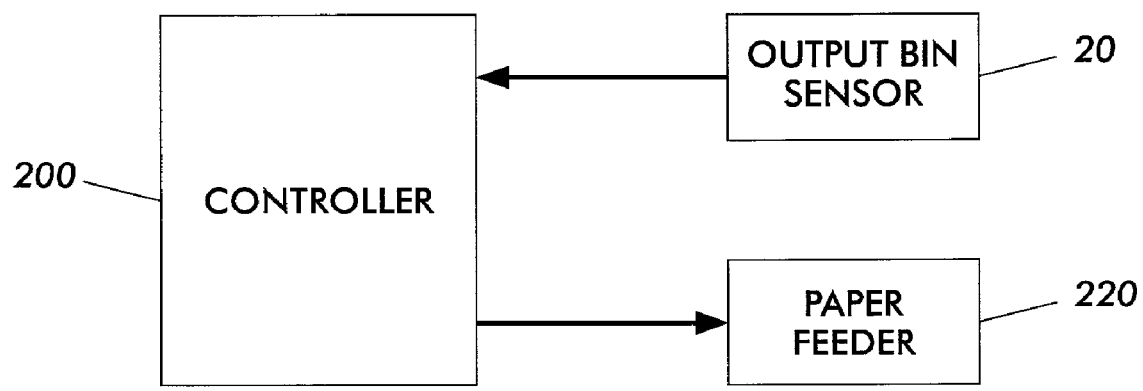
FIG. 2 shows schematic block diagram of a possible hardware configuration for the present invention.

FIG. 2 provides a concise schematical representation of a preferred embodiment. Controller 200 is coupled with output bin sensor 20. In a preferred embodiment controller 200 polls for an indicator from sensor 20. When sensor 20 indicates that the printout has been removed from the output bin the controller 200 executes a decision to end a counter/timer loop (if it was needed) and proceed directly to the printing of the new print job if any. As such the controller 200 may now skip directing the printer to generate a banner page or interrupt the banner sheet print if it has already begun printing.

In an alternative embodiment, the signal indication of printout removal from output bin by sensor 20 is handled by the controller 200 as an interrupt.

Those skilled in the art will understand what software changes are necessary for that scenario. Indeed, there are many other hardware and software specifics which will yield the same result, including for example custom logic circuits (ASIC FPGA, etc.) dedicated to implementing the logic flow discussed below.

Figure 3:
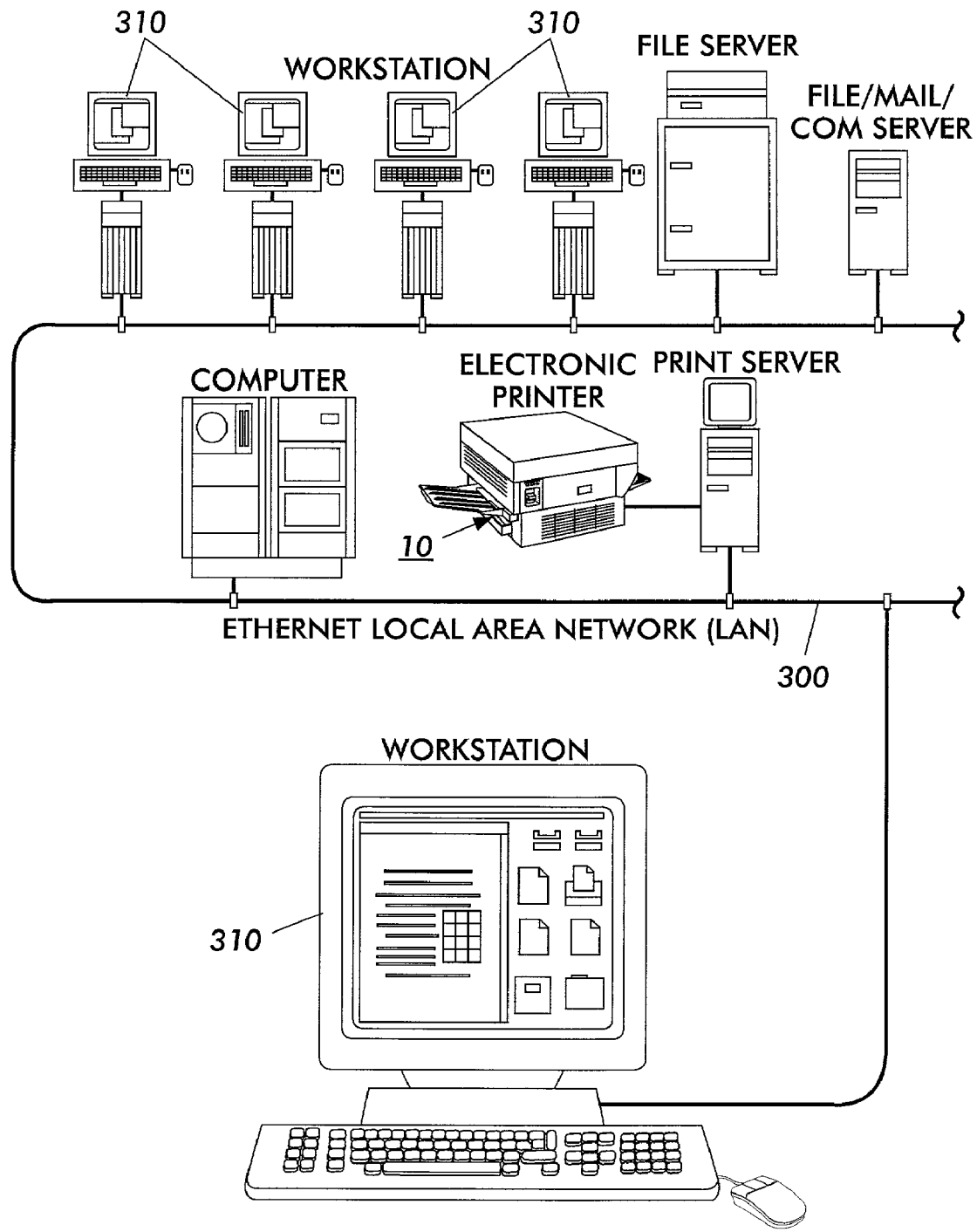
FIG. 3 shows a typical local area network configuration depicting workstations and shared resources including another type of typical printer.

In FIG. 3, merely by way of an example, the exemplary shared user electronic printer 10 (a laser type) is shown connected into a conventional prior art inner-office or inter-office system electronic local area network (LAN) 300 with various remote user terminals (workstations) 310, one of which is shown here in an enlarged view. Some other possible typical network system components are also illustrated and labeled.

Figure 4:
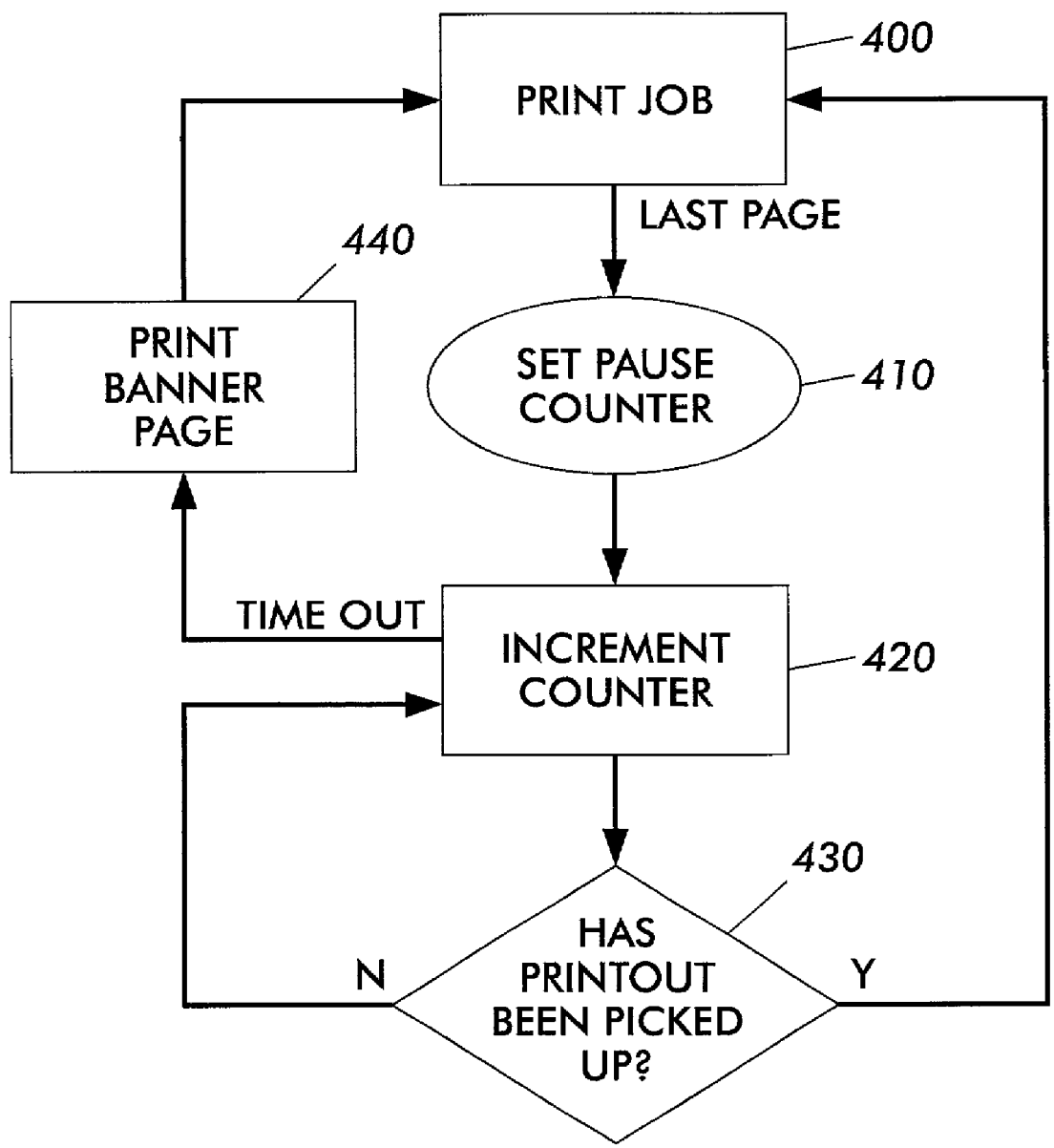
FIG. 4 depicts a flow chart for the present invention which makes allowance for an output bin sensor.

A preferred embodiment is depicted with FIG. 4. In this arrangement the printer 10 is connected to a local area network (LAN) 300 and receives print jobs from there. Printer 10 may be ink jet as above, or any type of printer suitable for connection to a LAN 300 and the handling of multi-page print jobs. At instruction block 400 the last page of a print job issues and so a command indicating that status is passed to the set pause counter block 410. This sets and starts the increment timer block 420. While a software timer is used here, it should be noted that in a normal LAN connected printer there is often a small delay as the data for generating the banner page (or header page) is polled from the server or over the network. This delay may be utilized instead in a preferred embodiment. The normal sequence is to proceed next to decision block 430 where a determination is made as to whether the job printout has been removed by monitoring the output bin sensor. If the determination is yes, then printing of the banner page is omitted or skipped over and the next print job if any may proceed. In the alternative if the determination is no then the counter is incremented at block 420. This sequence loops until either the printout is picked up or the counter times out. If indeed the counter times out, then the banner page is printed as shown with block 440 and the next print job if there is one is queued up and printed.

In order to facilitate the detection of banner pages, a particular pattern may be printed in a region easily accessible by the output bin sensor. In this manner it is possible to determine if the previous job has been removed while still leaving a stack of prior previously printed jobs in the output tray.

In many cases it is still possible to reduce waste even after the initiation of banner page printing, by interrupting the printing process. In a laser printer the printing process includes the following steps: 1) charging a photoreceptor then 2) exposing the photoreceptor with a latent, followed by 3) development of that latent, and then 4) transferring of the developed image to paper, and finally 5) cleaning of the photoreceptor. It is simple to abort printing during or after step one and proceed directly to step 5) without printing the banner page. In principle it is possible, although not preferred to interrupt the process during or after stage 3) and at least save a piece of paper even if the supplies placed on the photoreceptor are thereby wasted.

In a direct marking printer such as an ink jet printer there are no intermediate steps to interrupt. However, it is still possible to abort printing, thus saving on ink, even though this does not reduce the waste associated with the media (paper). There are also hybrid types of direct marking printers. In that situation the ink, typically a solid type ink, is printed onto a drum rather than directly on paper. This printing process can be interrupted during the time the image is being built up on the drum. A piece of paper can potentially be saved if a banner page abort comes prior to completion of the image. Ink from the intermediate image can be cleaned off by the normal cleaning system.

In summary, practicing the methodology of the present invention reduces the amount of paper, toner, ink or other consumable wasted on banner sheets when human attendance is available to intervene. By providing a sensor at the output bin or making use of one already there, intelligence may be provided with a small amount of additional code in the controller. This allows a less frustrating experience for an end user who, if anxious for printout, is willing to remove the current printout and need not wait for a banner sheet. But perhaps more importantly it reduces the amount of waste created from discarded banner sheets.

While the embodiment disclosed herein is preferred, it will be appreciated from this teaching that various alternative, modifications, variations or improvements therein may be made by those skilled in the art, which are intended to be encompassed by the following claims:

What is claimed is:

1. A method for a shared printer to provide print jobs with banner pages to its output bin, comprising:
   outputting a current print job to the output bin;
   pausing the output of a banner page for a fixed period of time where the pause is accomplished with a timer; and,
   skipping the printout of the banner page if the current print job is removed from the output bin before the fixed period of time has passed.

2. The method of claim 1 wherein the printer is connected to a local area network.

3. The method of claim 2 wherein the counter is an incrementing type.

4. The method of claim 2 wherein the counter is an decrementing type.

5. The method of claim 2 wherein the counter is achieved with nested loops of no-op micro-code commands.

6. The method of claim 2 wherein determination of the current page being removed from the output bin is accomplished with a sensor in the output bin.

7. A method for a network connected printer to provide print jobs with banner pages to its output bin, comprising:
   outputting a current print job to the output bin;
   pausing the output of a banner page for a fixed period of time as accomplished using a counter;
   sensing the output bin; and,
   skipping the printout of the banner page if the current print job is removed from the output bin before the fixed period of time has passed.

8. The method of claim 7 wherein the counter is an incrementing type.

9. The method of claim 7 wherein the counter is an decrementing type.

10. The method of claim 7 wherein the counter is achieved with nested loops of no-op micro-code commands.

11. The method of claim 7 wherein the step of skipping comprises the determination of the current page being removed from the output bin and that determination is accomplished with a sensor in the output bin.

12. The method of claim 11 a particular pattern is printed on the banner sheet to facilitate the determination.

13. A method for a shared printer to provide print jobs with a banner page to its output bin, comprising:
    outputting a current print job to the output bin;
    sensing the output bin; and,
    skipping the printout of the banner page if the current print job is removed from the output bin before a fixed period of time has passed as determined by a counter.

14. The method of claim 13 wherein the determination of the current page being removed from the output bin is accomplished with a sensor in the output bin.

15. The method of claim 14 wherein the sensor is a light sensing type.

16. The method of claim 14 wherein the sensor is a weight sensing type.

17. The method of claim 15 wherein the sensor is a LED detector pair.

18. The method of claim 15 wherein the determination of the current page being removed from the output bin is accomplished by polling the sensor.

19. The method of claim 15 wherein the determination of the current page being removed from the output bin is accomplished by receiving an interrupt from the sensor.

20. The method of claim 14 wherein a particular pattern is printed on the banner sheet to facilitate determining if a previous job is removed while still leaving a stack of previously printed jobs in the output tray.

* * * * *